United States Patent Office 2,901,586
Patented Aug. 25, 1959

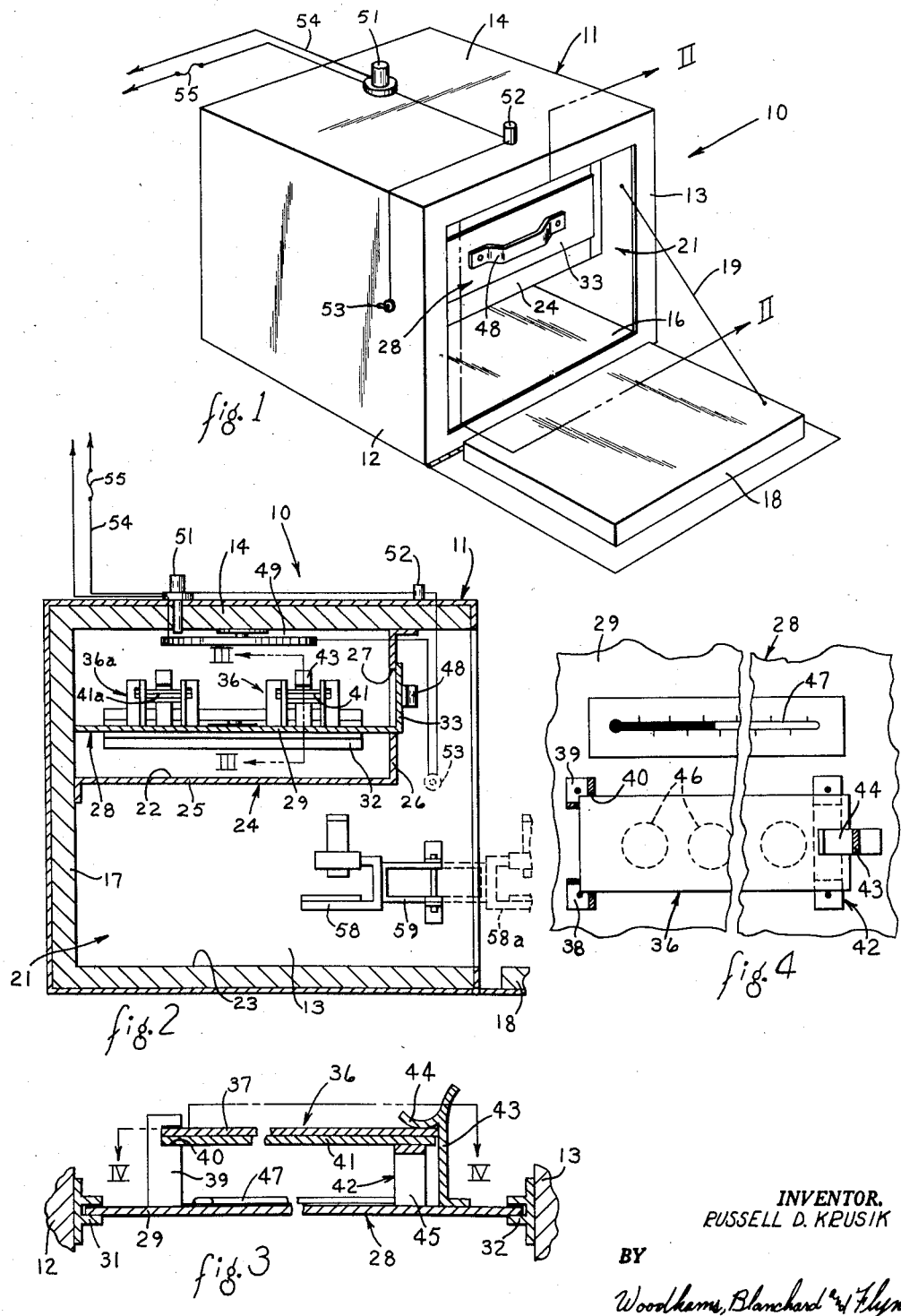

2,901,586

EVAPORATION APPARATUS

Russell D. Krusik, Kalamazoo Township, Kalamazoo County, Mich.

Application December 2, 1957, Serial No. 700,103

2 Claims. (Cl. 219—35)

This invention relates in general to an apparatus for evaporating liquid specimens and, more particularly, to a type thereof having a removable tray for supporting removable elements, such as slides, upon which said specimens are placed so that they can be visually examined under a microscope after the evaporation has taken place.

It is often necessary, as in the case of testing milk, to obtain the liquid specimens at a very substantial distance from a laboratory in which the equipment for evaporating and examining such specimens is usually maintained. Thus, even though a specimen is immediately transported to the laboratory for prompt examination, an appreciable amount of time must elapse between the taking and testing of the specimen, during which time contamination can occur and, more importantly, during which time the bacteriological condition of the specimen can change, even under the most favorable conditions. Numerous attempts have been made to overcome this problem, as by immediately placing the specimen under refrigeration and keeping it there until the specimen reaches the laboratory and is ready for examination. However, such previous precautions have not been able to prevent at least small changes in the condition of the specimen which can often produce unfavorable results.

Where, as is customary, the inspection trip, during which specimens are taken, covers a considerable amount of territory, the delay between the taking and testing of a specimen may be enough to cause an unsatisfactory test result for a specimen which would have been acceptable, if tested more promptly. Laboratory technicians are aware of this situation, but cannot make exceptions, particularly where health is involved. The present solution of this problem is to obtain another specimen and, in the meantime, withhold approval on the source of the specimen. This often results in costly repeat trips by the specimen collector and needless losses for the owners of the sources of the improperly disapproved specimens.

In the course of considering this problem, it was recognized that the specimen taking operation cannot normally be moved any closer to the laboratory and, therefore, some other means must be discovered whereby the delay between taking and testing a specimen can be reduced to a minimum.

Accordingly, a principal object of this invention is the provision of an apparatus whereby liquid specimens, such as specimens of milk, can be prepared for testing or examination at the place where the specimen is taken, thereby eliminating the time delay otherwise required in transporting the specimen to a testing laboratory.

A further object of this invention is the provision of an apparatus, as aforesaid, whereby liquid specimens can be placed upon a sterile slide and immediately placed in an evaporation oven, thereby virtually eliminating any possibility of contaminating the specimen or changing the bacteriological condition of the specimen before the evaporation has been completed, thereby insuring that the condition of the specimen will, when tested, be as close as conceivably possible to the condition of the source of the specimen at the moment the specimen was taken.

A further object of the invention is the provision of an apparatus, as aforesaid, which has an electrically energized heating element which is arranged to operate from the battery of an automobile without putting any undue strain upon such battery and which effects a relatively quick evopration of the liqiud specimen, thereby producing no material delay in the normal operations of the specimen collector.

A further object of this invention is the provision of an apparatus for evaporating liquid specimens, as aforesaid, which is relatively easy and inexpensive to construct, which is extremely easy to operate, which automatically and accurately controls the temperature produced by the heat source thereof and which can be operated easily and efficiently by any person capable of collecting specimens to be tested.

Other objects and purposes of this invention will become apparent to persons familiar with this type of equipment upon reading the following specification and examining the accompanying drawings in which:

Figure 1 is an oblique view of an apparatus characterizing the invention.

Figure 2 is a sectional view substantially as taken along the line II—II of Figure 1.

Figure 3 is a sectional view taken along the line III—III of Figure 2.

Figure 4 is a sectional view taken along the line IV—IV of Figure 3.

For convenience in description, the terms, "upper," "lower" and derivatives thereof will have reference to the apparatus in its normal position of operation, which is shown in Figures 1 and 2. The terms "front," "rear" and derivatives thereof will have reference to the right and left sides, respectively, of the structure appearing in Figure 2, the front side of such structure having an opening and door therefor. The terms "inner," "outer" and derivatives thereof will have reference to the geometric center of said apparatus and parts thereof.

*General description*

In order to meet the objects and purposes of this invention, including those set forth above, I have provided an apparatus for evaporating liquid specimens, comprising an oven having partition means defining a compartment in the upper portion of the oven and a heating element in the upper portion of said compartment. A specimen tray is slidably received into said compartment upon guideways supported upon the inner walls of said compartment. One or more slide supporting structures is mounted upon said tray so that said structures will be near said heating element when said tray is within said compartment. Said heating element is electrically connected in a series circuit with a thermostat, a switch, a monitor light, and conductor means for connecting said circuit to a source of energy, such as the electrical system of an automobile. The lower part of the oven is provided for storing equipment, supplies and, in one particular embodiment, a microscope for examining the evaporated specimens.

*Detailed description*

The evaporation apparatus 10 (Figure 1), selected to illustrate the invention, is comprised of a rectangular oven 11 defined by a pair of side walls 12 and 13, a top wall 14, bottom wall 16, rear end wall 17 and a door 18 which closes the front open end of said oven. The walls and door of said oven may be fabricated from any conventional type of insulating material, such as asbestos, protected and stiffened along its exterior surface by means, such as a metal shell. The door 18 is hingedly supported upon the front edge of the bottom wall 16 and is further connected to the side wall 13 by means of a chain 19, which holds said door 18 in a horizontal position when it is open, thereby providing a convenient working platform. The chamber 21 within the oven 11 has upper and lower compartments 22 and 23, respectively, separated by the partition 24 which, in this particular embodiment, has a substantially horizontal portion 25, which is secured to the rear end wall 17 approximately mid-way between the upper and lower ends thereof, and extends between the side walls 12 and 13. Said partition 24 also includes a substantially vertical portion 26, which extends between the front edge of the horizontal portion and said top wall 14.

The vertical portion 26 (Figure 2) of the partition 24 has an opening 27 through which a specimen tray 28 (Figures 2 and 3) is slidably receivable. Said specimen tray includes a relatively flat support plate 29 which is slidably supported upon and between a pair of channel shaped guideways 31 and 32 mounted upon the side walls 12 and 13, respectively, within the upper comparment 22, said guideways defining a horizontal plane passing through the opening 27 in the vertical portion 26 of the partition 24. The specimen tray 28 also has a front plate 33, which is secured and substantially perpendicular to the support plate 29, and which closes the opening 27 when the specimen tray 28 is in its operating position in the upper compartment 22. One or more slide support structures 36 are mounted upon the upper surface of the support plate 29 (Figures 2, 3 and 4) upon which means, such as conventional transparent microscope slides 37, are removably supported for holding liquid specimens to be evaporated. In this particular embodiment, two slide support structures 36 and 36a are disclosed. However, since both structures may be, and are, substantially identical in this particular embodiment, a detailed description of slide support structure 36, only, will be given and such description will be understood to apply in substance to the slide support structure 36a. Accordingly, parts of the slide support structure 36a will have the same numerical designations as their counterparts on the slide support structure 36, with the addition of the suffix "a."

Said slide support structure 36 (Figures 3 and 4) is comprised of a pair of spaced and preferably parallel support posts 38 and 39, which are here formed from lengths of an angle member and arranged so that their flanges extend away from the center of the support structure 36. Each post has a slot 40 between the ends thereof in which one end of a slide supporting platform member 41 is receivable. The slots 40 are preferably equidistant from the upper surface of the support plate 29. The other end of the platform member 41 is mounted upon the web of a U-shaped bracket 42, having legs 45 secured to the support plate 29 at a substantial distance from, and substantially in transverse alignment with, the support posts 38 and 39. The platform member 41 may be secured in such position upon the posts and bracket, if desirable, by cement, and may be fabricated from any suitable material, such as glass plate or stainless steel.

The slots 40 in the support posts 38 and 39 are sufficiently large that they extend above the upper surface of the member 41 for slidable reception of one end of a microscope slide 37 which is supported upon the platform member 41. In this particular embodiment, the platform member 41 is of substantially the same length and width as the microscope slide 37. A flexible strip 43 is supported at its lower end upon the support plate 29 adjacent the support bracket 42 for resilient bending movement toward and away from said bracket. A holding finger 44 secured to the strip 43 between its ends is normally disposed above the adjacent end of the platform member 41 for engaging a slide 37 thereon and holding it against the platform member 41. Where the platform member 41 is not rigidly secured to the bracket 42, the strip 43 may be rigid and the support plate 29 may be flexed in order to effect disengagement of the holding finger 44 from the transparent slide 37.

Said platform member 41 may be provided with spaced indicia 46, which are broken line circles in this particular embodiment. Where the platform member 41 is opaque, the circles are on the upper surface of the platform member where they are visible through the transparent slides 37 for positioning the liquid specimens thereon. Where the member 41 is transparent, the indicia 46 may be on either side.

A thermometer 47 is mounted in any convenient position upon the slide plate 29, such as between the slide support structures 36 and 36a. A handle 48 is mounted upon the vertical portion 33 of the specimen tray 28 for effecting easy removal and insertion of said tray with respect to the upper compartment 22.

The oven 11 is heated by an electrically energized element 49 mounted in any convenient position upon the lower surface of the top wall 14 within the upper compartment 22. Although the element 49 is disclosed in Figure 2 as directly above the slide supports 36 and 36a, it may be located either rearwardly or forwardly of such position in order, for example, to reduce or eliminate direct radiation upon said slides 37. A thermostat 51, which may be of any conventional type and manually adjustable, is mounted in the top wall 14 adjacent the heating element 49. A monitor or warning light 52 is mounted in the exterior surface of the top wall 14 near the front end thereof. A manually operable two-position switch 53 is mounted upon the exterior surface of the side wall 12. The heating element 49, thermostat 51, monitor light 52 and switch 53 are all connected in a series circuit by conductor means 54, and a fuse 55 may be placed in such series circuit for protection purposes. The conductor means 54 is connectable in a conventional manner with a source of electrical energy, such as the electrical system of an automotive vehicle.

The lower comparrtment 23 may be used for storage space, thereby minimizing contamination of equipment, such as the microscope slides used in the evaporation apparatus 10. Also, a microscope 58 may be mounted by means of a pivot bracket 59 upon the internal surface of the side wall 13 for pivotal movement from a solid line storage position (Figure 2) to a broken line operating position at 58a.

*Operation*

Under normal circumstances, operation of the evaporation apparatus 10 commences by opening the door 18 and removing the specimen tray 28. Slides 37 are placed upon one or both of the slide support structures 36 and 36a by first inserting one end of the slide 37 into the slots 40. The flexible strip 43 is then manually bent away from the member 41 until the slide 37 can be moved downward against and upon said member 41. The strip 43 is permitted to return to its normal position (Figure 3) wherein the finger 44 firmly holds the other end of the slide 37 against the platform member 41. Drops of the liquid being examined are now deposited upon the slide by any conventional device, such as a pipette, each drop being placed within one of the circular indicia 46, which can be seen through the transparent slide 37.

The specimen tray 28 (Figure 2) is slidably returned to its position between the guideways within the upper compartment 22 and the switch 53 is closed, which energizes the heating element 49 whereby the moisture in the specimens on the slides 37 is quickly evaporated. The temperature produced within the upper compartment 22 by the heating element 49 can be accurately and carefully controlled by the thermostat 51 and checked by the thermometer 47. Ordinarily the time required for evaporating the moisture out of a particular specimen requires a very short period of time, such as not in excess of 5 minutes. Thus, at the end of a predetermined period of time, the oven door 18 is opened and the specimen tray 28 is removed. The slides 37 containing the evaporated specimens are then removed from the slide support structure by flexing the strip 43 and moving the slides away from the platform members and out of the slots 40. Other specimen slides 37 can, if desired, be placed at once on the slide support structure for reception of additional specimens, after which the tray is returned to the upper compartment 22 for another evaporation operation. The evaporated specimens can be examined by means of the microscope 58 in its broken line position 58a or, if desired, by means of an independent microscope mounted elsewhere.

Accordingly, it will be seen that while one batch of specimens is being evaporated another batch can be collected or examined, thereby permitting a substantially continuous time saving operation heretofore unavailable. Furthermore, it will be seen that the entire preparation and testing of a specimen can be completed within a matter of minutes after a specimen has been taken from a particular source of the liquid to be tested.

When the testing operation has been completed, the microscope 58 is swiveled back into its solid line storage position of Figure 2, the conductor means 54 may be disconnected from its source of electrical energy, and the oven door 18 is closed so that the entire evaporation apparatus 10 is now secured and ready for immediate movement to another testing place.

Although a particular embodiment of the invention has been disclosed above in detail for illustrative purposes, it will be understood that variations or modifications thereof, which lie within the scope of the appended claims, are fully contemplated.

I claim:

1. Apparatus for evaporating liquid specimens, comprising: heat insulating means defining an oven having a door on one end thereof; partition means defining a compartment in the upper part of said oven, said partition means having an opening facing said door; a specimen tray and guide means within said compartment slidably engaging and supporting said tray for movement through said opening into said compartment, said tray having an upstanding wall at its outer end for closing said opening; electrical heating means in the upper end of said compartment; slide supporting means on said tray including a flat member substantially parallel with and spaced upwardly from said tray, said member having a plurality of spaced specimen indicia on the upper surface thereof and means for releasably holding a said slide on said member; a thermostat, a switch and conductor means connecting same in series with said electrical heating means.

2. In an apparatus for evaporating and thereby drying specimens on slides soon after such specimens have been taken in order to avoid change in the bacteriological condition thereof, said apparatus including an insulated enclosure having an opening at one end thereof and a movable door closing said opening, partition means at the upper end of said enclosure defining a compartment having an opening at the end thereof adjacent said door and electrical heating means within said compartment, the improvement which comprises: a slide supporting tray received through said opening in said compartment and supported for slidably guided movement inwardly and outwardly thereof, said tray having an upstanding wall for closing said opening in said compartment; slide supporting means including a plurality of longitudinally and transversely spaced upstanding posts secured upon said tray and a slide supporting plate mounted upon said posts and extending substantially parallel with said tray, said plate having a plurality of spaced indicia thereon for indicating the position of specimens; a thermometer mounted upon the upper surface of said tray for indicating the temperature in said compartment adjacent to said slide supporting means; and latch means on said tray for releasably engaging a slide supported on said plate and holding same in fixed position thereon whereby a slide may be placed on said plate and may be engaged by said latch means and liquid specimens may be deposited on said slide at positions thereon indicated by said indicia, said specimens thereupon being evaporated and dried by operation of said heating means.

References Cited in the file of this patent

UNITED STATES PATENTS

| | | |
|---|---|---|
| 1,341,903 | Hollenback | June 1, 1920 |
| 2,583,993 | Braun | Jan. 29, 1952 |
| 2,586,484 | Sabel et al. | Feb. 19, 1952 |
| 2,633,840 | Crawford | Apr. 7, 1953 |